UNITED STATES PATENT OFFICE.

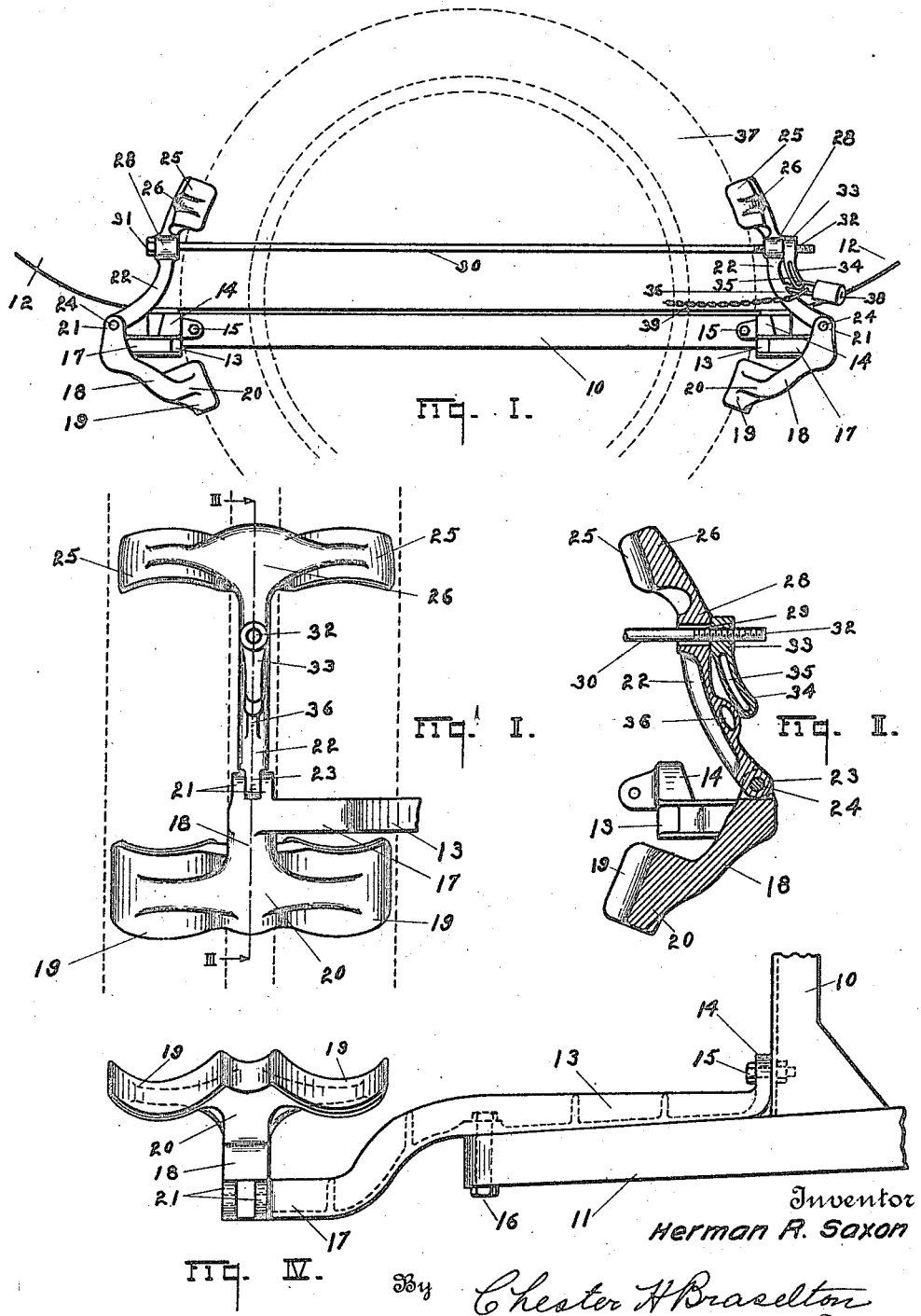

HERMAN R. SAXON, OF TOLEDO, OHIO, ASSIGNOR, BY MESNE ASSIGNMENTS, TO INDUSTRIAL RESEARCH CORPORATION, OF TOLEDO, OHIO, A CORPORATION OF DELAWARE.

TIRE CARRIER FOR AUTOMOBILES.

1,412,753.   Specification of Letters Patent.   Patented Apr. 11, 1922.

Application filed October 13, 1917. Serial No. 196,484.

*To all whom it may concern:*

Be it known that I, HERMAN R. SAXON, a citizen of the United States, residing at Toledo, in the county of Lucas and State of Ohio, have invented certain new and useful Improvements in Tire Carriers for Automobiles, of which I declare the following to be a full, clear, and exact description.

This invention relates to improvements in tire carriers for motor vehicles.

The principal object of this invention is to provide an improved tire carrier, which can be used for carrying either spare demountable rims and tires or spare wheels, and which is so constructed that it will permit the removal of the mounting of the spare wheels or tires very readily and provides means whereby the spare wheels or tires may be locked in place when they are mounted, so as to prevent the unauthorized removal of the same. A further object of my invention is to provide an improved tire carrier, which is especially adapted for carrying two spare wheels or tires at the same time. A further object of my invention is to provide a tire carrier, which is very strong and durable and which can be very cheaply and economically produced in large quantities.

Further objects, and objects relating to economies of manufacture and details of construction, will definitely appear from the detailed description to follow.

I accomplish the objects of my invention by the devices and means described in the following specification. My invention is clearly defined and pointed out in the appending claims.

A structure constituting a preferred embodiment of my invention is illustrated in the accompanying drawing, forming a part of this specification, in which Fig. I is a view in rear elevation of a motor vehicle, showing a tire carrier embodying my invention, a spare tire being shown in place by means of dotted lines.

Fig. II is a fragmentary view in side elevation of a tire carrier constructed in accordance with my invention.

Fig. III is a detail, sectional view, taken substantially on the line III—III of Fig. II, and Fig. IV is a fragmentary, top plan view.

In the drawings, similar reference numerals refer to similar parts throughout the several views, and the sectional view is taken looking in the direction of the little arrows at the ends of the section line.

Considering the numbered parts of the drawing, I have shown my tire carrier secured and attached to the rear end of a motor vehicle frame, comprising the rear cross member 10 and the side members 11, the ends of which extend rearwardly some distance beyond the cross member 10. The body is indicated at 12.

A bracket 13 is secured to each side member 11, the forward end of said bracket being provided with a laterally turned end 14, through which a bolt 15 passes to secure the rear end of said bracket to the cross member 10. A bolt 16 secures the bracket 13 to the rear end of the side member 11. Each bracket 13 extends rearwardly and laterally from its point of connection with the side member 11, as shown in Fig. IV. From the rear end of the rear portion 17 of the bracket 13, an arm 18 extends downwardly and inwardly, and the lower end of said arm is provided with a pair of concave tire seats 19, which are adapted to engage the tread of the tire. Said concave tire seats 19 are connected by the web 20, which is integral with the arm 18.

The rear end 17 of the bracket 13, at its junction with the arm 18, is formed with a pair of upstanding lugs 21. An arm 22 is provided, having at its lower end a lug 23, which is disposed between the lugs 21 before mentioned, so that the arm 22 is pivotally connected to the arm 18 by means of a pin 24, passing through the lugs 21 and 23. The upper end of the arm 22 is provided with a pair of concave tire seats 25, which are adapted to engage the tread of the tire, said seats being connected by the web 26, which is integral with the arm 22. Arm 22 is provided with a boss 28, disposed near the web 26, and each boss 28 has an opening 29 therethrough, through which a rod 30 extends. The rod 30 has the head 31 on one end, which abuts the outer face of the boss 28 on one of the arms, and the opposite end of said rod 30 is threaded at 32 and has threaded thereon a member 33, the head of which abuts the outer face of the boss 28 on the other arm 22 of the tire carrier.

The member 33 is provided with a handle portion 34, having a slot 35 therein, and a boss 36 is formed on the corresponding arm 22, having an opening 36' therein, through which the shackle of a padlock 38 may extend. Said opening 36' is so disposed with reference to the slot 35 in the arm 34 that, when said member 33 is turned so that it is brought into juxtaposition with said opening 36', the shackle of the padlock 38 will pass through both the slot 35 and the opening 36', so as to prevent rotation of the member 33.

The spare tire is represented by dotted lines and indicated by the reference numeral 37. It might be possible to remove the spare tire from this tire carrier by deflating the tire, and hence a chain 39 may be passed around the tire and the ends of the chain engaged by the shackle of the padlock 38, so that it prevents removal of the tire in this way.

From the description of the parts given above, the operation of this device should be very readily understood.

In Fig. I, I have shown a spare tire placed in the tire carrier, and locked therein. In order to remove this tire, the padlock 38 is unlocked and the chain 39 removed. The removal of padlock 38 permits the rotation of the member 33, on the threaded end 32 of the rod 30, and when this member is rotated and unscrewed from the end of the rod 30, the rod 30 may be removed so that the arms 22 may be swung back on the pivots 24. When this is done, the tire can be removed from the carrier by a straight upward lift. It will be apparent that it is not always necessary to remove the rod 30, but that the member 33 can be screwed off sufficiently so that the arms 22 may be swung back enough to permit the lifting of the tire, without completely removing the rod 30.

The tire is mounted in place and secured by the reverse movement. That is to say, the tire is seated in the carrier with its tread engaging the lower concave tire seats 19, and the arms 22 are then swung around until the upper concave tire seats 25 engage the tread of the tire, on the opposite side of the horizontal diameter thereof from the tire seats 19, and the member 33 is then screwed up on the road 30 so as to lock the arms 22 against separation. The padlock 38 then has its shackle run through the opening 35 and 36', in order to prevent any rotation of the member 33 to release the arms of the tire carrier.

I am aware that the particular embodiment of my invention, which I have here shown and described, is susceptible of considerable variation without departing from the spirit thereof, and, therefore, I desire to claim my invention broadly, as well as specifically, as indicated by the appended claims.

Having thus described my invention, what I claim as new and desire to secure by Letters Patent, is:

1. A device of the class described comprising the combination with a vehicle frame; of a bracket secured to each side member thereof; an arm extending from the rear end of each bracket and provided with a tire seat adapted to engage a tire; an arm hinged to the rear end of each bracket and provided with a tire seat adapted to engage the upper part of a tire; and means preventing the separation of said hinged arms.

2. A device of the class described comprising the combination with a vehicle frame; of a bracket secured to each side member thereof; an arm extending downwardly from the rear end of each bracket and provided with a tire seat at its lower end; an arm hinged to the rear end of each bracket and provided with a tire seat at its upper end; and means for preventing the separation of said hinged arms.

3. A device of the class described comprising the combination with a vehicle frame; of a bracket secured to each side member thereof; an arm extending downwardly and laterally from the rear end of each bracket and provided with a concave inwardly facing tire seat at its lower end; an arm hinged to the rear end of each bracket and extending upwardly therefrom and having a concave inwardly facing tire seat at its upper end; and means for preventing the separation of said hinged arms.

4. A device of the class described comprising the combination with a vehicle frame; of a bracket secured to each side member thereof; an arm extending downwardly and laterally from the rear end of each bracket, and provided with a concave inwardly facing tire seat at its lower end; an arm hinged to the rear end of each bracket and extending upwardly therefrom and having a concave inwardly facing tire seat at its upper end; a rod extending through both of said hinged arms and having a head abutting the outer face of one of said arms; a member threaded on the other end of said rod and engaging the outer face of the other arm; and means for preventing the rotation of said member.

5. A device of the class described comprising the combination with a vehicle frame; of a bracket secured to each side member thereof; an arm extending downwardly from the rear end of each bracket and provided with a pair of concave inwardly facing tire seats at its lower end; an arm hinged to the rear end of each bracket and extending upwardly therefrom, and having a pair of concave inwardly facing tire seats at its upper end; and means for preventing the separation of said hinged arms.

6. A device of the class described comprising the combination with a vehicle frame;

of a bracket secured to each side member thereof, having an arm extending downwardly and laterally from the rear end of said bracket, and provided with a concave tire seat at its lower end; an arm hinged to the rear end of each bracket and extending upwardly therefrom, and having a concave tire seat at its upper end; and a locking rod connecting said hinged arms and adapted to draw said arms toward each other.

7. A device of the class described comprising the combination with a vehicle frame; of a bracket secured to each side member thereof, and extending rearwardly therefrom; an arm extending downwardly and laterally from the rear end of each bracket and provided with a concave tire seat at its lower end; an arm hinged to the rear end of each bracket and extending upwardly therefrom and having a concave tire seat at its upper end; means for drawing said hinged arms toward each other and for preventing the separation of said arms.

8. A device of the class described comprising the combination with a vehicle frame; of fixed tire receiving members, provided with downwardly extending arms having concave tire seats at their lower ends for engaging opposite sides of the tire; movable tire receiving members, provided with upwardly extending arms having concave tire seats at their upper ends for engaging the tire upon the opposite side of the center line of the tire from the first named tire engaging members; means for drawing said movable tire receiving members toward each other and for preventing the separation of said members.

9. A device of the class described comprising the combination with a vehicle frame; of fixed tire receiving members secured thereto, and comprising arms extending downwardly and laterally and each provided with a concave tire seat at its lower end for engaging the tire at a point intermediate the top and bottom thereof; movable tire receiving members comprising arms extending upwardly and each provided with a concave tire seat at its upper end; a locking rod connecting said arms; and a member threaded on said rod and adapted to draw said arms towards each other, said member being provided with a slotted handle adapted to receive a padlock whereby to lock said member against rotation.

10. A device of the class described comprising the combination with a vehicle frame; of fixed tire receiving members, comprising downwardly extending arms, each having a concave tire seat at its lower end for engaging the tire at a point intermediate the top and bottom thereof; movable tire engaging members comprising upwardly extending arms, each having a concave tire seat at its upper end; a locking rod connecting said movable arms; a member threaded on said rod and provided with a slotted handle; a chain adapted to encircle the tire; and a padlock engaging the ends of said chain, said arm and said slotted handle, to lock the member against rotation and lock the tire against removal.

11. In a device of the character described, a vehicle frame, a pair of spaced brackets secured upon the frame, each provided with a downwardly extending arm having at its lower end a tire engaging portion, a tire engaging member pivoted upon each of said arms above said tire engaging portions and extending into engagement with the tire and means connecting said pivoted tire engaging members transversely of the frame.

In testimony whereof I affix my signature.

HERMAN R. SAXON.